United States Patent
Chu et al.

(10) Patent No.: US 10,762,017 B2
(45) Date of Patent: Sep. 1, 2020

(54) USB TRANSMISSION SYSTEM, USB DEVICE, AND HOST CAPABLE OF USB TRANSMISSION

(71) Applicant: REALTEK SEMICONDUCTOR CORPORATION, Hsinchu (TW)

(72) Inventors: Shih-Chiang Chu, Taipei (TW); Chia-Hung Lin, New Taipei (TW); Zhen-Ting Huang, Yunlin County (TW); Er-Zih Wong, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/546,845

(22) Filed: Aug. 21, 2019

(65) Prior Publication Data
US 2020/0065281 A1 Feb. 27, 2020

(30) Foreign Application Priority Data
Aug. 23, 2018 (TW) .............................. 107129516 A

(51) Int. Cl.
G06F 13/42 (2006.01)
G06F 13/38 (2006.01)
H04L 12/26 (2006.01)
G06F 13/16 (2006.01)

(52) U.S. Cl.
CPC ........ G06F 13/382 (2013.01); G06F 13/1694 (2013.01); H04L 43/022 (2013.01); G06F 2213/0042 (2013.01)

(58) Field of Classification Search
None
See application file for complete search history.

(56) References Cited

U.S. PATENT DOCUMENTS

| 9,274,986 | B2 | 3/2016 | Chen et al. | |
| 2003/0112802 | A1* | 6/2003 | Ono | H04L 29/06 370/389 |
| 2006/0174043 | A1* | 8/2006 | Oh | G06F 3/061 710/105 |
| 2014/0258567 | A1* | 9/2014 | Chen | G06F 13/28 710/22 |

OTHER PUBLICATIONS www.wikipedia.com, USB 3.0, Feb. 2014, pp. 1-12 (Year: 2014).*

\* cited by examiner

*Primary Examiner* — Henry Tsai
*Assistant Examiner* — Dean Phan
(74) *Attorney, Agent, or Firm* — WPAT, PC

(57) ABSTRACT

Disclosed is a USB transmission system capable of classifying transmission data with a device so as to allow a host to use the transmission data easily. The USB transmission system includes a USB device and a host. The USB device parses the header of an input packet to find out the type of the input packet, tags the input packet with one of identifications according to the type of the input packet, and then outputs the input packet to the host. The host allocates data storage spaces of a system memory that are associated with the identifications respectively, receives the input packet, and stores the input packet in a first data storage space according to a first identification carried by the input packet, in which the first identification is one of the identifications and the first data storage space is one of the data storage spaces.

20 Claims, 5 Drawing Sheets

USB TRANSMISSION SYSTEM, USB DEVICE, AND HOST CAPABLE OF USB TRANSMISSION

BACKGROUND OF THE INVENTION

1. Field of the Invention

The present invention relates to a USB transmission technique, especially to a USB transmission technique capable of classifying transmission data with a device.

2. Description of Related Art

Regarding existing techniques, if a Universal Serial Bus (USB) device intends to efficiently transfer data from a memory of the USB device to a system memory of a host through a USB interface, the USB device can reduce the number of transfer times with an aggregation technique and thereby lower the utilization of a CPU of the host. However, since the data transferred from the memory of the USB device to the system memory of the host are not classified, the host need to parse the data it received to find out the type of the data for utilization.

The above-mentioned techniques are found in the following literature: Applicant's US patent (U.S. Pat. No. 9,274, 986 B2).

SUMMARY OF THE INVENTION

An object of the present invention is to provide a USB transmission system, a USB device, and a host capable of USB transmission. The system, device, and host can increase their operation efficiency with the early classification of transmission data.

An embodiment of the USB transmission system of the present invention includes a USB device and a host. The USB device is configured to parse a header of an input packet to find out a type of the input packet, then tag the input packet with one of multiple identifications according to the type of the input packet, and then output the input packet to the host. The host is configured to allocate multiple data storage spaces of a system memory that are associated with the multiple identifications respectively, receive the input packet, and store the input packet in a first data storage space according to a first identification included in the input packet, in which the first identification is one of the multiple identifications, the first data storage space is one of the multiple data storage spaces, and the first data storage space is associated with the first identification.

An embodiment of the USB device of the present invention includes a device memory, a memory access control circuit, and a USB device controller. The device memory is configured to store an input packet. The memory access control circuit is configured to parse a header of an input packet to find out a type of the input packet, then tag the input packet with one of multiple identifications according to the type of the input packet, and then output the input packet to the USB device controller. The USB device controller is configured to receive a setting message from a host to be informed of the multiple identifications and then provide the multiple identifications for the memory access control circuit; furthermore, the USB device controller is configured to receive the input packet from the memory access control circuit and output the input packet including one of the multiple identifications to the host.

An embodiment of the host capable of USB transmission of the present invention includes a system memory and a USB host controller. The system memory is configured to allocate multiple data storage spaces according to the execution of a driver program, in which the multiple data storage spaces are associated with multiple identifications respectively while the multiple identifications are associated with multiple network packet types respectively. The USB host controller is configured to inform a USB device controller of the multiple identifications, receive an input packet from the USB device controller, and store the input packet in a first data storage space associated with a first identification included in the input packet, in which the first identification is one of the multiple identifications and the first data storage space is one of the multiple data storage spaces.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention includes a Universal Serial Bus (USB) transmission system, a USB device, and a host capable of USB transmission. The system, device, and host can increase their operation efficiency by the early classification of transmission data; the early classification is preferably carried out by a device that is an intermediary between the source of the transmission data and the destination of the transmission data.

Figure 1:
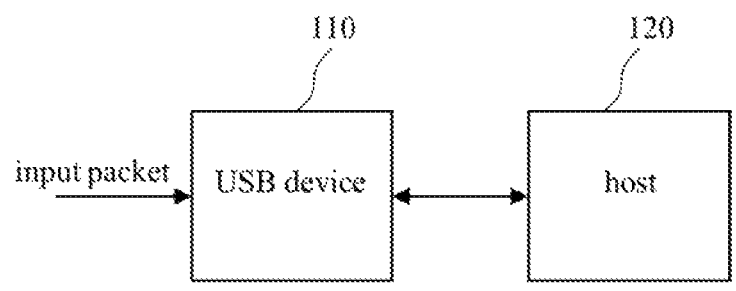
FIG. 1 shows an embodiment of the USB transmission system of the present invention.

FIG. 1 shows an embodiment of the USB transmission system of the present invention. As shown in FIG. 1, the USB transmission system 100 includes a USB device 110 and a host 120 capable of USB transmission. The USB device 110 (e.g., USB network adapter such as USB-Ethernet network adapter or USB-Wi-Fi network adapter) is configured to parse the header of an input packet to find out the type of the input packet, then tag the input packet with one of multiple identifications according to the type of the input packet, and then output the input packet to the host 120. It should be noted one carrying out the present invention can associate different identifications with different packet types (e.g., different network packet types) respectively in accordance with the demand for implementation; it should also be noted that the operation of parsing and tagging a packet can be a known or self-developed operation. The host 120 (e.g., desktop computer, notebook computer, tablet PC, or mobile device) is configured to allocate multiple data storage spaces of a system memory (e.g., the multiple data storage spaces of the system memory 410 of FIG. 4) that are associated with the multiple identifications respectively, receive the input packet from the USB device 110, and then store the input packet in a first data storage space according to a first identification included in the input packet, in which the first identification is one of the multiple identifications, the first data storage space is one of the multiple data storage spaces, and the first data storage space is associated with the first identification. It should be noted that allocating the multiple data storage space can be realized with a known or self-developed technique.

Please refer to FIG. 1. In an exemplary implementation of the embodiment of FIG. 1, the host 120 determines the multiple identifications and informs the USB device 110 of the multiple identifications so that the USB device can tag the input packet with one of the multiple identifications. For instance, a driver program executed by the host 120 determines the multiple identifications according to default setting or user setting; for another instance, the above-mentioned driver program determines the multiple identifications according to a USB 3.0 standard. In an exemplary implementation of the embodiment of FIG. 1, the host 120 allocates the multiple data storage spaces of the system memory, that are associated with the multiple identifications respectively, according to the USB 3.0 standard; more specifically, the USB 3.0 standard specifies a stream mode, the operation of the stream mode establishes several data buffers at the bulk points of a host (e.g., host 120) and a device (e.g., USB device 110), each bulk point is capable of transmitting stream data in a multimode manner, each stream has its own stream ID, and therefore the host 120 can allocate the multiple data storage spaces associated with the multiple identifications (i.e., stream IDs here) in accordance with the USB 3.0 standard. In an exemplary implementation of the embodiment of FIG. 1, the USB device 110 finds out the type of the input packet according to at least one of a source port number and a destination port number included in the header of the input packet; in this case, the input packet is a wired or wireless network packet conforming to Transmission Control Protocol (TCP). Of course the USB device 110 can find out the type of the input packet according to other fields (e.g., a field of Ether Type such as RoCE (RDMA (remote direct memory access) over Converged Ethernet) protocol, or an IP header field indicating the type of service) included in the header of the input packet, especially those fields related with the setting of packet transmission priority and/or the setting of delay.

Figure 2:
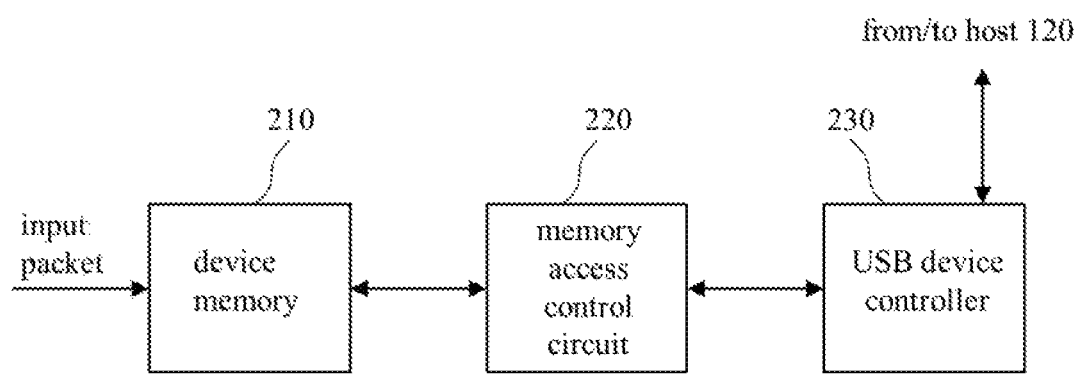
FIG. 2 shows an embodiment of the USB device of FIG. 1.

FIG. 2 shows an embodiment of the USB device 110 of FIG. 1. As shown in FIG. 2, the USB device 110 includes a device memory 210, a memory access control circuit 220, and a USB device controller 230. The device memory 210 (e.g., first-in-first-out buffer, FIFO buffer) is configured to store the input packet and other packets, each of which can be classified as the input packet is classified. The memory access control circuit 220 (e.g., direct memory access controller, DMA controller) is configured to parse the header of the input packet and thereby find out the type of the input packet, then tag the input packet with one of the multiple identifications, and then output the input packet to the USB device controller 230. The USB device controller 230 is configured to receive a setting message from the host 120 to learn about the multiple identifications and the packet types that are associated with the multiple identifications respectively, and provide the multiple identifications and the packet types for the memory access control circuit 220 to allow the memory access control circuit 220 to identify and tag packets. The USB device controller 230 is also configured to receive the input packet, which has been tagged with one of the multiple identifications, from the memory access control circuit 220 and then output the input packet to the host 120. In an alternative embodiment of the USB device 110, the multiple identifications and the packet types respectively associated with the identifications are prestored in the USB device 110; in this case, the host 120 can optionally send no setting messages to the USB device 110.

Please refer to FIG. 2. When a first predetermined condition (e.g., an occupied amount of the device memory 210 being higher than a first threshold) is satisfied, the memory access control circuit 220 starts an operation of outputting the data of the device memory 210 (including the input packet) to the host 120 through the USB device controller 230; before a second predetermined condition (e.g., an output data amount, that is to say the amount of data outputted to the host 120, reaching a second threshold and being less than the second threshold plus a packet data amount, and/or the occupied amount of the device memory decreasing to zero for a predetermined time) is satisfied, the memory access control circuit 220 continues to execute the operation of outputting the data of the device memory 210 to the host 120 through the USB device controller as long as there exist data in the device memory 210. After the second predetermined condition is satisfied, the memory access control circuit 220 stops the operation of outputting the data of the device memory 210 to the host 120 through the USB device controller 230; for instance, as soon as the output data amount reaches the second threshold, if the memory access control circuit 220 is transmitting a packet to the USB device controller 230, the memory access control circuit 220 can stop the whole transmission immediately or continue to transmit till the packet is completely transmitted, and accordingly the maximum transmission amount of each transmission process (which starts when the occupied amount is higher than the first threshold and stops when the output data amount reaches the second threshold and doesn't exceed the second threshold plus the packet data amount) should not be more than the second threshold plus the data packet amount. After the memory access control circuit 220 decides to stop current transmission, the memory access control circuit 220 can inform the USB device controller 230 of the halt of the current transmission with a proper manner (e.g., changing the value of a register that is accessible to the USB device controller 230 or sending a notification signal to the USB device controller 230); afterwards, the USB device controller 230 can send a halt signal (e.g., short packet) to the host 120 to inform the host 120 of the halt of the current transmission. Since the above-mentioned transmission operation and the related operation thereof are found in Applicant's US patent (U.S. Pat. No. 9,274,986 B2) and those of ordinary skill in the art can appreciate how to apply the techniques of the patent to the present invention, repeated and redundant description is omitted here.

Figure 3:
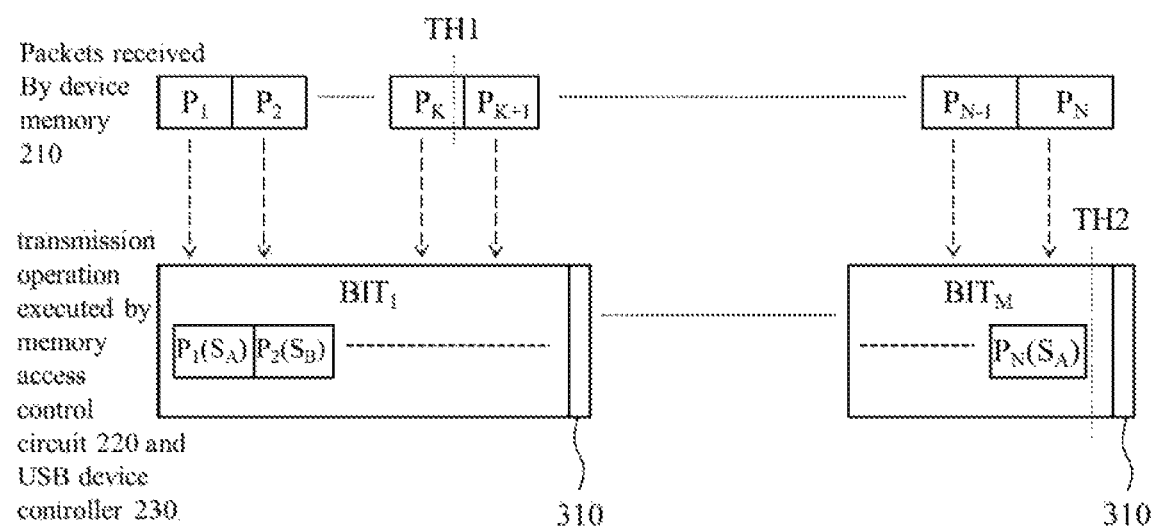
FIG. 3 shows an exemplary implementation of the packet transmission carried out by the USB device of FIG. 2.

FIG. 3 shows an exemplary implementation of the packet transmission carried out by the USB device of FIG. 2. As shown in FIG. 2 and FIG. 3, the device memory 210 is a FIFO buffer used for successively receiving and storing a plurality of packets $P_1, P_2, \ldots, P_K, P_{K+1}, \ldots, P_{N-1}$, and $P_N$, in which both the suffix "K" and the suffix "N" are positive integers. Before the memory access control circuit 220 starts the operation of outputting the data of the device memory 210 to the host 120, if the aforementioned first predetermined condition (e.g., the total data amount of the packets $P_1, P_2, \ldots, P_{K-1}$ plus a partial data amount of the packet $P_{K+1}$ (which amount to the aforementioned occupied amount) reaching the aforementioned first threshold TH1) is satisfied, this triggers the memory access control circuit 220 to start a bulk-in transfer (BIT) (e.g., one of the bulk-in transfers of $BIT_1, \ldots,$ and $BIT_M$ of FIG. 3, in which the suffix "M" is a positive integer) and thus the memory access control circuit 220 receives packets from the device memory 210, parses the header of each packet, tags each packet with one of the aforementioned multiple identifications (e.g., $S_A$, $S_B$ of FIG. 3) according to the type of the packet to be tagged, and outputs each packet to the host 120 through the USB device controller 230. The above-mentioned transmission operation will continue till the aforementioned second condition (e.g., the aforementioned output data amount reaching the aforementioned second threshold TH2 but being less than the second threshold TH2 plus a packet data amount) is satisfied, and if the second condition is satisfied, the memory access control circuit 220 notifies the USB device controller 230 that the transmission operation is done so as to allow the USB device controller 230 to notify the host 120 of the completion of the transmission operation by sending a halt signal (e.g., the short packet 310 of FIG. 3) to the host 120 and then finish the transmission operation this time (e.g., the transmission of the bulk-in transfer $BIT_1$ and the short packet 310 following $BIT_1$). The transmission operation next time is similar to the above-mentioned process.

Figure 4:
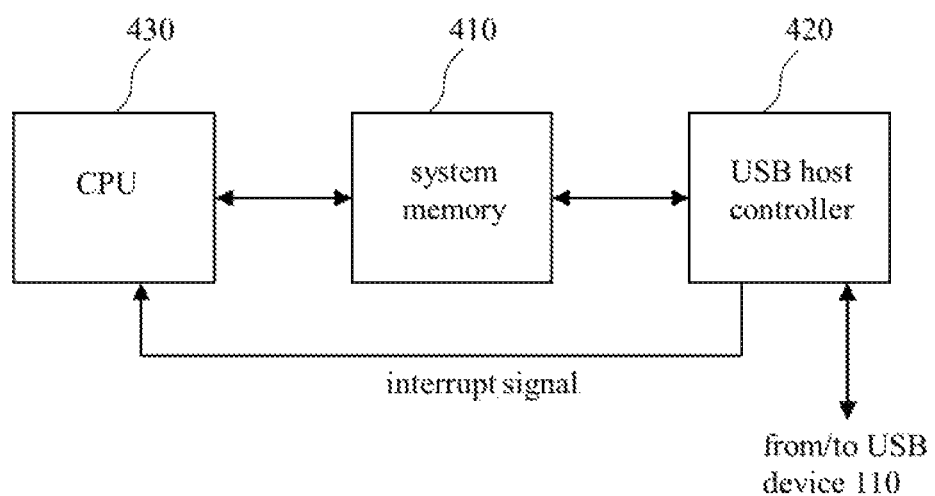
FIG. 4 shows an embodiment of the host capable of USB transmission of FIG. 1.

FIG. 4 shows an embodiment of the host 120 of FIG. 1. As shown in FIG. 4, the host 120 includes a system memory 410, a USB host controller 420, and a CPU 430. The system memory 410 is configured to allocate multiple data storage spaces according to the execution of the aforementioned driver program, in which the multiple data storage spaces are associated with multiple identifications respectively while the multiple identifications are associated with multiple network packet types respectively in this embodiment. The USB host controller 420 is configured to inform a USB device controller (e.g., the USB device controller 230 of FIG. 2) of the multiple identifications and the multiple network packet types, receive an input packet from the USB device controller, and store the input packet in a first data storage space associated with a first identification included in the input packet, in which the first identification is associated with a first type of the multiple network packet types and all the data of the first data storage space are data of at least one network packet of the first type. It should be noted that when the USB device controller transmits the aforementioned short packet or some halt signal to the USB host controller 420 to inform the USB host controller 420 of the halt of transmission, the USB host controller 420 sends an interrupt signal to the CPU 430 to request the CPU 430 to process the classified data that are stored in the multiple data storage spaces respectively. Since the above-mentioned data reception operation and storage operation are found in Applicant's US patent (U.S. Pat. No. 9,274,986 B2) and people of ordinary skill in the art can appreciate how to apply the techniques of the patent to the present invention, repeated and redundant description is omitted here.

Figure 5:
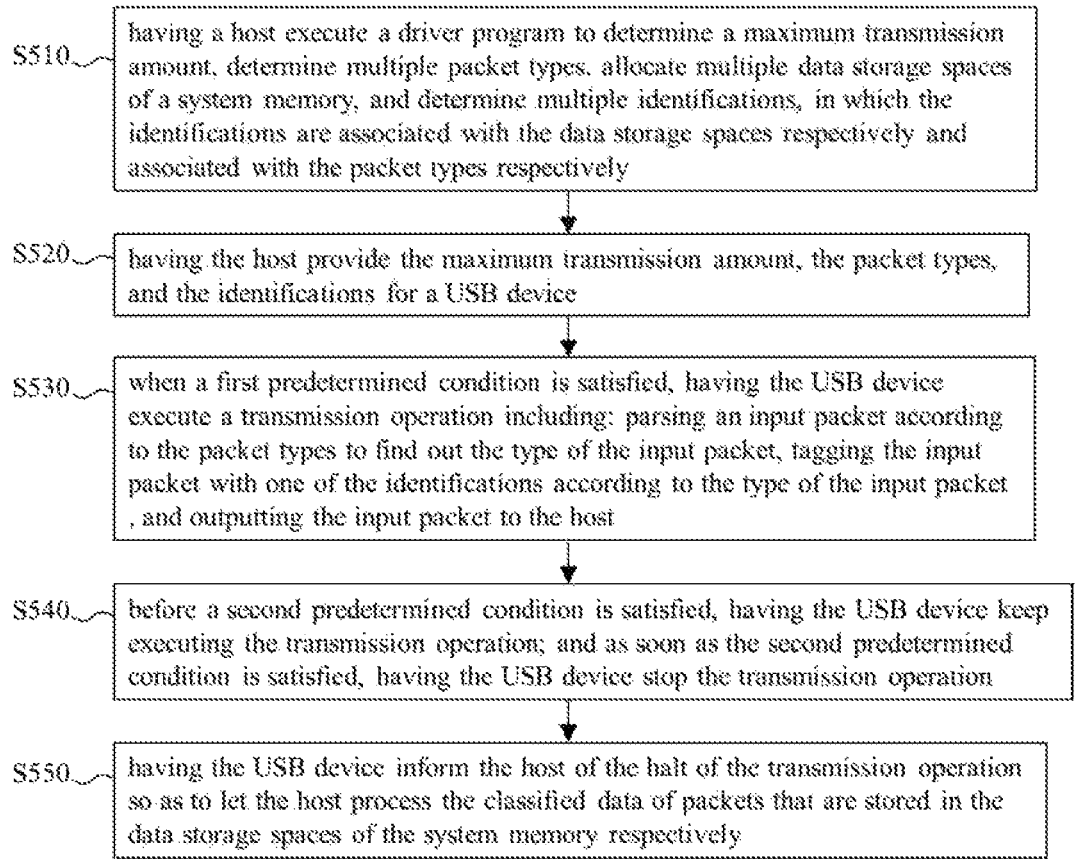
FIG. 5 shows an embodiment of the USB transmission method of the present invention.

The present invention further discloses a USB transmission method which can be carried out by the USB transmission system of FIG. 1. FIG. 5 shows an embodiment of the method, including the following steps:

step S510: having a host execute a driver program to determine a maximum transmission amount (e.g., the aforementioned second threshold plus a packet data amount), determine a plurality of packet types, allocate a plurality of data storage spaces of a system memory, and determine a plurality of identifications, in which the identifications are associated with the data storage spaces respectively and associated with the packet types respectively.

step S520: having the host provide the maximum transmission amount, the packet types, and the identifications for a USB device.

step S530: when a first predetermined condition is satisfied, having the USB device execute a transmission operation including: parsing an input packet according to the packet types to find out the type of the input packet, tagging the input packet with one of the identifications according to the type of the input packet, and outputting the input packet to the host.

step S540: before a second predetermined condition is satisfied, having the USB device keep executing the transmission operation; and as soon as the second predetermined condition is satisfied, having the USB device stop the transmission operation.

step S550: on the basis of step S540, having the USB device inform the host of the halt of the transmission operation so as to let the host process the classified data of packets that are stored in the data storage spaces of the system memory respectively.

Since those of ordinary skill in the art can appreciate the detail and modification of the embodiment of FIG. 5 by referring to the disclosure of the embodiments of FIGS. 1~4, repeated and redundant description is omitted here.

It should be noted that each of the USB device 110 and the host 120 can be implemented alone. It should also be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the USB transmission system, the USB device, and the host capable of USB transmission of the present invention can increase their efficiency of the whole transmission operation with the early classification of data.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:
1. A USB transmission system, comprising:
a USB device configured to parse a header of an input packet to find out a type of the input packet, then tag the input packet with one of multiple identifications according to the type of the input packet, and then output the input packet to a host, in which the type of the input packet is a first type and the input packet is tagged with a first identification of the multiple identifications; and
the host configured to allocate multiple data storage spaces of a system memory that are for multiple types of packets respectively, receive the input packet, and store the input packet in a first data storage space according to the first identification included in the input packet, in which the multiple types of packets include their respective identifications of the multiple identifications, the first identification is one of the multiple identifications, the first data storage space is one of the multiple data storage spaces, and the first data storage space is for storing packets tagged with the first identification, wherein the USB device and the host are two independent apparatuses and are connected.

2. The USB transmission system of claim 1, wherein the host determines the multiple identifications and informs the USB device of the multiple identifications and accordingly the USB device tags the input packet with one of the multiple identifications.

3. The USB transmission system of claim 1, wherein the USB device finds out the type of the input packet according to at least one of a source port number and a destination port number included in the header of the input packet.

4. The USB transmission system of claim 1, wherein the input packet to be parsed by the USB device is a network packet.

5. The USB transmission system of claim 1, wherein the host allocates the multiple data storage spaces according to a USB 3.0 standard.

6. The USB transmission system of claim 1, wherein the USB device includes:
a device memory configured to store the input packet; and
a memory access control circuit, in which when an occupied amount of the device memory is higher than a first threshold, the memory access control circuit starts an operation of outputting data of the device memory to the host through a USB device controller, and when an output data amount reaches a second threshold and is less than the second threshold plus a packet data amount, the memory access control circuit stops the operation of outputting the data of the device memory to the host through the USB device controller.

7. The USB transmission system of claim 6, wherein after the memory access control circuit starts the operation of outputting the data of the device memory to the host through the USB device controller, if the occupied amount decreases to zero for a predetermined time, the memory access control circuit stops the operation of outputting the data of the device memory to the host through the USB device controller.

8. The USB transmission system of claim 1, wherein the USB device includes:
a device memory configured to store the input packet; and
a memory access control circuit, in which when an occupied amount of the device memory is higher than a first threshold, the memory access control circuit executes an operation of outputting data of the device memory to the host till the occupied amount decreases to zero for a predetermined time.

9. A USB device, comprising:
a device memory configured to store an input packet;
a memory access control circuit configured to parse a header of an input packet to find out a type of the input packet, then tag the input packet with one of multiple identifications according to the type of the input packet, and then output the input packet to a USB device controller; and
the USB device controller configured to receive a setting message from a host to be informed of the multiple identifications and then provide the multiple identifications for the memory access control circuit, the USB device controller further configured to receive the input packet from the memory access control circuit and output the input packet including one of the multiple identifications to the host.

10. The USB device of claim 9, wherein the memory access control circuit finds out the type of the input packet according to at least one of a source port number and a destination port number included in the header of the input packet.

11. The USB device of claim 9, wherein the input packet to be parsed by the memory access control circuit is a network packet.

12. The USB device of claim 11, wherein the network packet is a wired network packet or a wireless network packet.

13. The USB device of claim 9, wherein the USB device conforms to a USB 3.0 standard.

14. The USB device of claim 9, wherein when an occupied amount of the device memory is higher than a first threshold, the memory access control circuit starts an operation of outputting data of the device memory to the host through the USB device controller, and when an output data amount reaches a second threshold and is less than the second threshold plus a packet data amount, the memory access control circuit stops the operation of outputting the data of the device memory to the host through the USB device controller.

15. The USB device of claim 14, wherein after the memory access control circuit starts the operation of outputting the data of the device memory to the host through the USB device controller, if the occupied amount decreases to zero for a predetermined time, the memory access control circuit stops the operation of outputting the data of the device memory to the host through the USB device controller.

16. The USB device of claim 9, wherein when an occupied amount of the device memory is higher than a first threshold, the memory access control circuit executes an operation of outputting data of the device memory to the host till the occupied amount decreases to zero for a predetermined time.

17. The USB device of claim 9, wherein when a transmission condition is satisfied, the USB device controller sends a short packet to the host to inform the host of the USB device stopping transmission.

18. A host capable of USB transmission, comprising:
a system memory configured to allocate multiple data storage spaces according to execution of a driver program, in which the multiple data storage spaces are for multiple types of packets that are tagged according to multiple identifications respectively, and the multiple identifications are indicative of multiple network packet types respectively; and
a USB host controller configured to inform a USB device controller of the multiple identifications, receive an input packet from the USB device controller, and store the input packet including a first identification in a first data storage space that is for storing packets tagged with the first identification, in which the first identification is one of the multiple identifications and the first data storage space is one of the multiple data storage spaces.

19. The host of claim 18, wherein setting of the multiple identifications and allocation of the multiple data storage spaces conform to a USB 3.0 standard.

20. The host of claim 18, wherein the first identification is indicative of a first type of the multiple network packet types and data of the first data storage space are data of at least one network packet of the first type.

* * * * *